(12) United States Patent
Evans et al.

(10) Patent No.: US 9,239,959 B1
(45) Date of Patent: Jan. 19, 2016

(54) MULTI-RESOLUTION, WIDE FIELD-OF-VIEW, UNMANNED GROUND VEHICLE NAVIGATION SENSOR

(71) Applicant: Lockheed Martin Corporation, Grand Prairie, TX (US)

(72) Inventors: Bruno J Evans, Keller, TX (US); William Dale Cotten, Palestine, TX (US); Don Alan Larson, McLean, VA (US)

(73) Assignee: Lockheed Martin Corporation, Grand Prairie, TX (US)

( * ) Notice: Subject to any disclaimer, the term of this patent is extended or adjusted under 35 U.S.C. 154(b) by 123 days.

(21) Appl. No.: 13/858,366

(22) Filed: Apr. 8, 2013

(51) Int. Cl.
*G06K 9/00* (2006.01)

(52) U.S. Cl.
CPC .................................. *G06K 9/00791* (2013.01)

(58) Field of Classification Search
None
See application file for complete search history.

(56) References Cited

U.S. PATENT DOCUMENTS

| | | | |
|---|---|---|---|
| 5,006,721 A | 4/1991 | Cameron et al. | |
| 5,118,180 A | 6/1992 | Wichmann et al. | |
| 5,202,742 A | 4/1993 | Frank et al. | |
| 5,528,354 A | 6/1996 | Uwira | |
| 5,793,491 A | 8/1998 | Wangler et al. | |
| 5,805,275 A | 9/1998 | Taylor | |
| 5,864,391 A * | 1/1999 | Hosokawa et al. | 356/4.01 |
| 6,288,817 B2 | 9/2001 | Rowe | |
| 6,317,202 B1 | 11/2001 | Hosokawa et al. | |
| 6,727,511 B2 * | 4/2004 | Cusick | G01S 17/87 250/221 |
| 6,882,409 B1 * | 4/2005 | Evans | G01S 7/481 250/339.01 |
| 7,002,669 B2 | 2/2006 | Frick | |
| 7,187,445 B2 | 3/2007 | Schanz et al. | |
| 7,261,176 B2 | 8/2007 | Chun et al. | |
| 7,271,822 B2 | 9/2007 | Towner | |
| 7,382,442 B2 | 6/2008 | Adachi et al. | |
| 7,464,775 B2 | 12/2008 | Clemens et al. | |
| 7,649,616 B2 * | 1/2010 | Michael et al. | 356/4.01 |

(Continued)

FOREIGN PATENT DOCUMENTS

| | | |
|---|---|---|
| DE | 4115747 A1 | 11/1992 |
| JP | H05264915 A | 10/1993 |
| JP | H11326498 A | 11/1999 |

OTHER PUBLICATIONS

Rosenbush et al., "Super-Resolution Enhancement of Flash Ladar Range Data", Proceedings of SPIE, 2007.*

(Continued)

*Primary Examiner* — Matthew Bella
*Assistant Examiner* — Jason Heidemann
(74) *Attorney, Agent, or Firm* — Withrow & Terranova, PLLC

(57) ABSTRACT

An imaging system includes: a transmit side that generates a plurality of switched beam laser signals and scans each of the switched beam laser signals into a respective field of view by two polygon facets simultaneously of a polygonal mirror, the respective fields of view overlapping in at least a portion thereof; and a receive side that receives a plurality of reflections of the laser signals, detects them, and captures them as three-dimensional imagery data. A method includes: generating a plurality of switched beam laser signals from a single laser signal; scanning each of the switched beam laser signals in seriatim into a respective field of view by each of two polygonal facets of a polygonal mirror, the respective fields of view overlapping in at least a portion thereof; receiving reflections of the switched beam laser signals; and generating a set of three-dimensional imagery from the received reflections.

17 Claims, 5 Drawing Sheets

(56) References Cited

U.S. PATENT DOCUMENTS

| | | | |
|---|---|---|---|
| 8,238,612 B2* | 8/2012 | Susca et al. | 382/107 |
| 8,672,065 B2 | 3/2014 | Beck et al. | |
| 8,958,654 B1* | 2/2015 | Evans | G06T 5/20 |
| | | | 356/5.01 |
| 8,976,340 B2* | 3/2015 | Gilliland et al. | 356/5.01 |
| 2002/0139942 A1* | 10/2002 | Cusick | G01S 17/87 |
| | | | 250/559.29 |
| 2007/0080001 A1 | 4/2007 | Beck et al. | |
| 2009/0276105 A1* | 11/2009 | Lacaze et al. | 701/2 |
| 2010/0106356 A1* | 4/2010 | Trepagnier et al. | 701/25 |
| 2010/0128243 A1 | 5/2010 | Liebman et al. | |
| 2010/0188722 A1 | 7/2010 | Yamada et al. | |
| 2010/0271614 A1* | 10/2010 | Albuquerque et al. | 356/4.01 |
| 2010/0295945 A1* | 11/2010 | Plemons | B60R 1/00 |
| | | | 348/148 |
| 2011/0106324 A1* | 5/2011 | Tsadka et al. | 700/287 |
| 2012/0038962 A1* | 2/2012 | Lewis et al. | 359/203.1 |
| 2012/0261516 A1* | 10/2012 | Gilliland et al. | 244/183 |

OTHER PUBLICATIONS

Schuon et al., "LidarBoost: Depth superresolution for ToF 3D shape scanning," Jun. 2009, IEEE CVPR 2009, pp. 343-350.*

* cited by examiner

MULTI-RESOLUTION, WIDE FIELD-OF-VIEW, UNMANNED GROUND VEHICLE NAVIGATION SENSOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field

The present invention pertains to navigation of unmanned ground vehicles, and more particularly to data acquisition for navigation of unmanned vehicles.

2. Description of Related Art

This section introduces information that may be related to various aspects of the technique described and/or claimed below. It provides background information to facilitate a better understanding of the various aspects of the present invention. As the section's title implies, this is a discussion of "related" art. That such art is related in no way implies that it is also "prior" art. The related art may or may not be prior art. The discussion in this section of this document is to be read in this light, and not as admissions of prior art.

Unmanned autonomous ground vehicles ("UAGV") are becoming more prevalent as associated technologies become more capable. One such technology is navigation. As UAGVs become more ubiquitous, the need for them to safely navigate their environments similarly increases. The presently disclosed technique is directed to resolving, or at least reducing, such problems as are encountered in the art. Even if solutions are available to the art to address these issues, the art is always receptive to improvements or alternative means, methods and configurations. Thus, there exists and need for technique such as that disclosed herein.

SUMMARY

In a first aspect, an imaging system, comprises: a transmit side that generates a plurality of switched beam laser signals and scans each of the switched beam laser signals into a respective field of view by two polygon facets simultaneously of a polygonal mirror, the respective fields of view overlapping in at least a portion thereof; and a receive side that receives a plurality of reflections of the laser signals, detects them, and captures them as three-dimensional imagery data.

In a second aspect, a method, comprises: generating a plurality of switched beam laser signals from a single laser signal; scanning each of the switched beam laser signals in seriatim into a respective field of view by each of two polygonal facets of a polygonal mirror, the respective fields of view overlapping in at least a portion thereof, receiving reflections of the switched beam laser signals; and generating a set of three-dimensional imagery from the received reflections.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure. The apparatus will first be discussed, which will be followed by a discussion of its operation.

Figure 1:
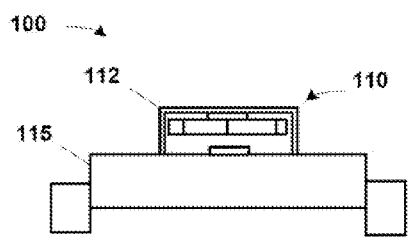
FIG. 1 depicts an exemplary UAGV including the imaging system of the presently disclosed technique in a "front" plan view plan view.

The presently disclosed technique implements a visual navigation system for an UAGV. One exemplary vehicle 100 is shown in FIG. 1 in a "front" plan view. Those in the art having the benefit of this disclosure will realize the depiction therein is highly stylized. The vehicle 100 is a wheeled vehicle, but alternative embodiments may be implemented with tracked vehicles, or vehicles using a combination of wheels and tracks, or some other alternative known to the art. Some embodiments may be implemented in, for example, the vehicles disclosed in U.S. Pat. No. 7,261,176, U.S. Pat. No. 7,464,775, or U.S. application Ser. No. 11/609,517, modified as described herein. Each of these references is incorporated by reference below to more fully teach various aspect of an exemplary vehicle with which the presently disclosed technique may be employed.

The vehicle 100 includes a three-dimensional ("3D"), optical imaging system 110 in accordance with some aspects of the presently disclosed technique. Only a portion of the imaging system 110 is visible in FIG. 1, the remainder being shown in FIG. 2A-FIG. 2C. The visible portion of the imaging system 110 is protected by a housing 112 mounted to the chassis 115 of the vehicle 100. The housing 112 protects the imaging system 110 from the environment and may help shield it from electromagnetic interference in some embodiments. The housing 112 may be closed by a window or remain open depending on the embodiment.

Figure 2A:
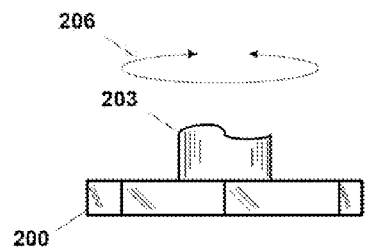
FIG. 2A-FIG. 2E illustrate a three-dimensional, optical imaging system in accordance with some aspects of the presently disclosed technique as deployed on the vehicle of FIG. 1.

Turning now to FIG. 2A-2E, the portion of the imaging system 110 visible in FIG. 1 is better shown in FIG. 2A and comprises a polygonal mirror 200. In operation, the polygonal mirror 200 rotates upon a spindle 203 as indicated by the graphic 206. The rotation is, in the illustrated embodiment, for 360° and may be either clockwise or counter-clockwise. The rotation is performed by a motor (not shown). The motor may be mounted within the housing 112 or within the chassis 115 of the vehicle 100. In the illustrated embodiment, given the orientation of the polygonal mirror 200 and spindle 203 relative to the chassis 115, the motor will be mounted in the housing 112.

Figure 2B:
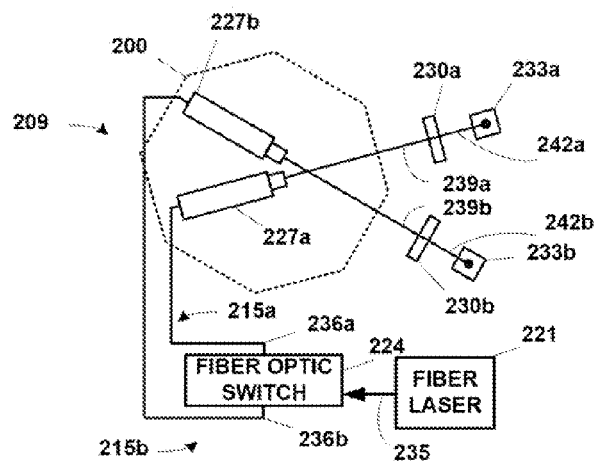
Figure 2C:
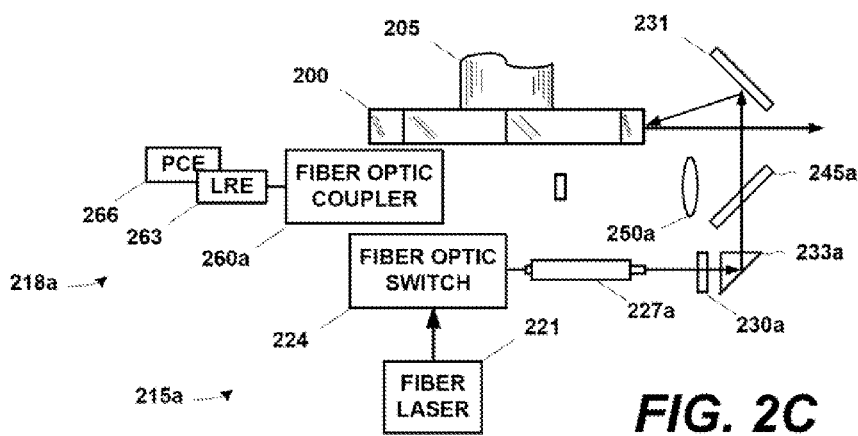
Figure 2D:
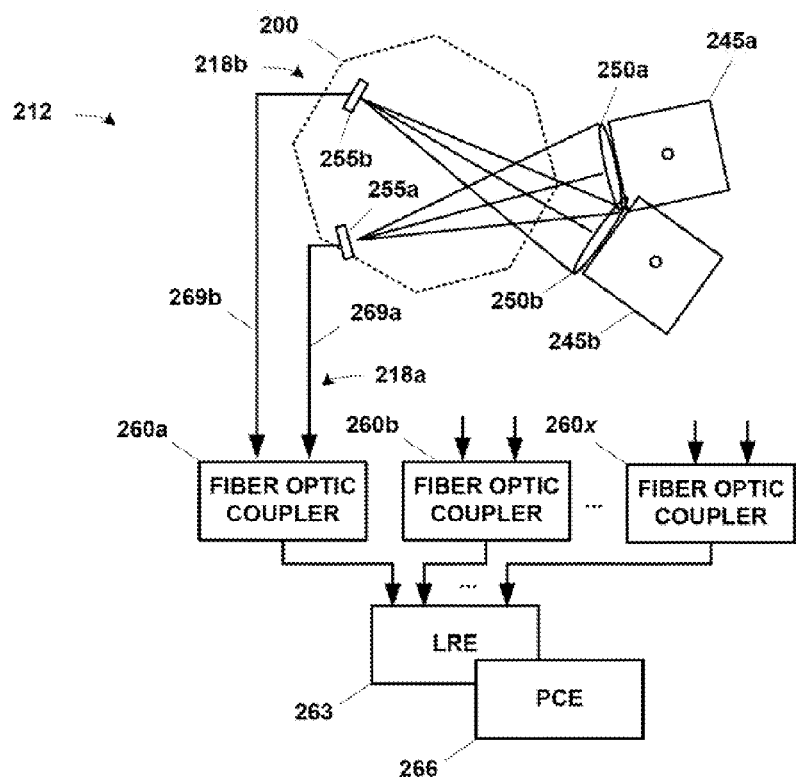

The polygonal mirror 200 is also shown in FIG. 2B and FIG. 2D in ghosted lines. These are overhead views and show that the mirror 200 is heptagonal in this embodiment. The number of sides in the polygonal mirror 200 is not material. However, the number of sides will affect some operational parameters including timing, rotational speed, field of view ("FOV"), etc. Thus, while the technique admits variation in the number of sides to the polygonal mirror 200, it remains a design consideration in any given implementation.

Figure 2E:
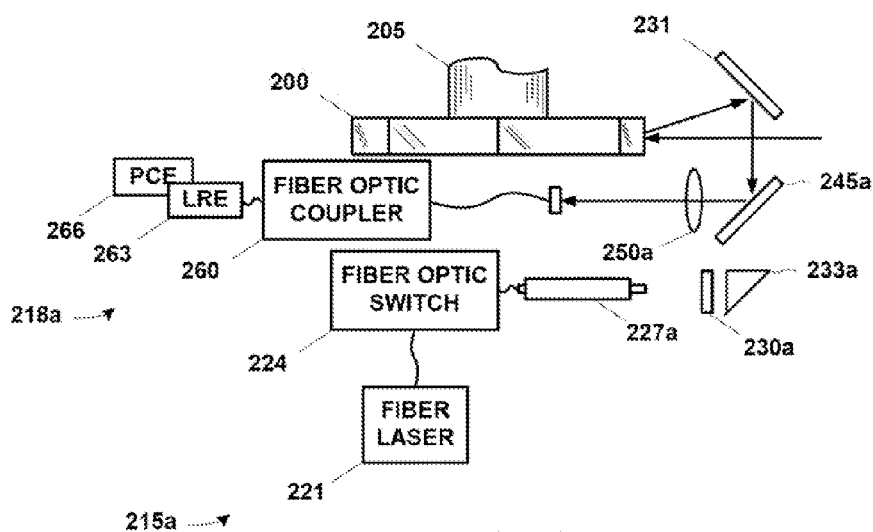

The imaging system 110 comprises a transmit side 209, shown in FIG. 2B, and a receive side 212, shown in FIG. 2D. FIG. 2C and FIG. 2E actually show elements of both the transmit and receive sides 209, 212 as will become apparent from the discussion below. More particularly, FIG. 2B and FIG. 2D are overhead views and FIG. 2C and FIG. 2E are side views. Each of the transmit and receive sides 209, 212 comprises two propagation paths. The transmission side 209 includes first and second transmission paths 215a-b. The receive side 212 includes first and second sides 218a-b. Note that FIG. 2C and FIG. 2E, because they are side views only show one of the two transmit paths and only one of the two receive paths.

As mentioned above, FIG. 2B conceptually depicts the transmit side 209 of the imaging system 110 in an overhead view. The transmit side 209 includes a fiber laser 221, a fiber optic switch 224, a pair of fiber coupled laser collimators 227a-b, a pair of beam segmenters 230a-b, and a pair of turning prisms 233a-b. The fiber coupled laser collimator 227a, beam segmenter 230a, and turning prism 233a comprise a first transmission path 215a. Similarly, the fiber coupled laser collimator 227b, beam segmenter 230b, and turning prism 233b comprise a first transmission path 215b. Each transmission path 215a, 215b furthermore includes a turning mirror 231, shown in FIG. 2C.

The fiber laser 221 generates a single laser signal propagating through optical fiber 235 to the fiber optic switch 224. Fiber lasers are, generally, lighter, more compact, lower heat, self-aligning, and more energy efficient than the conventional lasers used in these type applications. A laser is generally an optical fiber doped with substances that, when appropriately excited, acts as a waveguide, amplifies and emits a laser signal. For example, a fiber laser may be a Germanium (Ge) doped double-clad fibers made "active" by doping the core with gain materials (e.g., Ytterbium or Erbium) that when excited by pump energy in the clad amplifies a seed laser signal. Selection of the dopants depends on the output wavelength of interest. For instance, Erbium is used for 1550 nm whereas Ytterbium is used for 1064 nm.

The injection of pump light in the cladding of the double-clad actively doped fiber amplifiers serves as the excitation method. Dopant concentrations, pump power, and length of active fiber determine the resulting gain. The only electrical energy used is to drive seed diode and pump diodes. For operational reasons, the output end of the fiber laser is usually fused to a piece of compatible inactive fiber (i.e., only doped with Ge and not doped with a gain material) that is "mode coupled." The laser signal is then delivered from the fiber laser through the mode coupled delivery fiber.

In one particular embodiment, the fiber laser 221 is implemented using the fiber laser techniques disclosed in U.S. Pat. No. 7,649,616, incorporated by reference below, modified as shown herein. However, other approaches may be used. Some embodiments may even eschew the use of fiber lasers for more conventional lasers typically used in LADAR systems. However, these more conventional lasers may introduce difficulties and complexities such as accurate optical alignment, greater weight and size, and higher power consumption.

One aspect of the presently disclosed technique is that it uses laser signals at "eye-safe" wavelengths, which permits the technique to be used in tactical applications. There is a general consensus in the art as to what constitutes an "eye-safe" frequency. The illustrated embodiment employs a 1550 nm laser. Other embodiments may use other wavelengths. Some embodiments may even employ wavelengths that are not "eye-safe" with the understanding of how that might limit application of that particular embodiment. A wavelength of 1550 nm is also advantageous in that, unlike near-infrared ("NIR") wavelengths, it is not detectable by the usual night vision technologies currently in use.

The optical switch 224 switches the signal between the first transmission path 215a and the second transmission path 215b. Optical switches are well known in the art and any suitable optical switch may be used. The optical switch 224 effectively synchronously splits the original beam generated by the fiber laser 221 into two beams in seriatim, one for the first transmission path 215a and one for the second transmission path 215b. In some embodiments, the optical switch 224 may be replaced by a three-port optical circulator, depending upon timing constraints, or some other kind of suitable component. The optical switch 224 is therefore but one means for switching the original beam generated by the fiber laser 221. Alternative embodiments may employ alternative means, including means of equivalent structure, that perform that function.

The switched beams then proceed to the respective fiber coupled laser collimators 227a-b over the optical fibers 236a-b. The collimators 227a-230b collimate the switched beams to minimize their divergence. This type of beam conditioning is well known in the art. Some embodiments may expand the switched beams or use some combination of collimation and expansion depending on the implementation. In one embodiment, the collimators 227a-230b are implemented using the compact collimator form disclosed in U.S. application Ser. No. 12/623,739, incorporated by reference below.

The collimated beams 239a-b are then passed to the beam segmenters 230a-b. The beam segmenters 230a-b divide each of the split, collimated beams 239a-b into a plurality of beam segments (not shown) arrayed on a common plane, initially overlapping, and diverging in a fan shaped array. In this embodiment, the common plane of the beam segments is vertically oriented so that the beams segments are arrayed in elevation. The segments may be, and hereafter will be, referred to as "beamlets". The divergence of the beamlets is not so great as to produce separation thereof within the imaging system 110. However, it is preferably sufficiently great to provide a small degree of separation at the target, as the fan-shaped beam array is scanned over the target as described below.

Beam segmentation can be accomplished by using a series of calcite wedges, a holographic diffraction grating or a phased diffraction grating. Other techniques are known to the art and any suitable, known technique may be employed. One particular embodiment uses a phased diffraction grating because of its predictable performance and power handling capability. The number of beamlets will be implementation specific. In the illustrated embodiments, the collimated beams 239a-b are segmented into 11 beamlets.

The segmented beams 242a-b are then directed upward to the polygonal mirror 200 by the turning prisms 233a-b and the turning mirrors 231 (shown in FIG. 2C). Because FIG. 2A presents an overhead view, this is not readily apparent therein. However, the turning prisms 233a-b, with the turning mirrors 231 turn the segmented beams 242a-b upward, through the apertures in the holed mirrors 245a, 245b, and to the polygonal mirror 200. The polygonal mirror 200 then reflects then into the field of view as described below.

The receive side 212 is shown in FIG. 2C. The receive side 212 includes a pair of holed mirrors 245a-b, a pair of receive lenses 250a-b, a pair of optical receivers 255a-b, a plurality of fiber optic couplers 260a-x, a set of laser receiver electronics ("LRE") 263, and a set of pulse capture electronics ("PCE") 266. The number of optical couplers 260 is the same as the number of beamlets. Just as the transmit side 209 includes first and second transmit paths 215a-b, so the receive side 212 has first and second receive paths 218a-b. The number of inputs to each of the optical couplers 260 is the same as the number of receive paths 21. Each optical coupler 260 therefore couples one beamlet of each receive path 218 to the LRE 263. Returns from the field of view are received through the holed mirrors 245a-b and focused by the receive lenses 250a-b onto the optical receivers 263a-b.

Recall that the transmitted beams are segmented. Accordingly, the optical receivers 263a-b comprise arrays of optical detectors (not shown) and the optical feeds 269a-b are bundled optical fibers (not separately shown). There consequently also is one fiber optic coupler 260 for each beamlet in the received signal. The illustrated embodiments segment the collimated beams 239a-b, and so the optical receivers 255a-b each comprises 11 optical detectors (not individually shown) and the optical feeds 269a-b are optical fiber bundles that each comprises 11 optical fibers (also not individually shown). Each optical fiber in the optical fiber bundles 240a-b carries a signal from a respective one of the optical detectors to a respective fiber optic coupler 260. The optical detectors, optical fibers, and fiber optic couplers 260 can each be referred to as a "channel". Thus, the illustrated embodiments can be said to have 11 channels.

The detected signals are transmitted over the optical feeds 269a-b to the fiber optic couplers 260a-x, which couple the optical feeds 269a-b to the LRE 263 and the PCE 266. More precisely, the fiber optic couplers 260 join the detected signals from the first and second receive paths 218a-b. Note that because of the switching and the spatial relationships in the transmit side 209 described above, the receive paths 218a-b will not simultaneously present two signals to the fiber optic couplers 260.

The LRE 263 and PCE 266 operate in conventional fashion to condition the received signals—e.g., convert from analog to digital in the LRE 263—and capture the information in them—e.g., storing the information by the PCE 266. The conventional techniques for receiving and pulse capture should be modified to reflect departures from conventional practice on the transmit side 209. However, such modifications shall be readily apparent to those skilled in the art having the benefit of this disclosure.

In the illustrated embodiments, both the transmit side 209 and the receive side 212 employ optical alignment and signal conditioning techniques. Such techniques are well known to the art and will be implementation specific. Thus, those elements of the imaging system 110 devoted to optical alignment or signal conditioning are but exemplary means for aligning various components and conditioning signals. Other embodiments may use equivalent means for performing those functions, particularly where there is variation in implementation specific design constraints. Note that the illustrated embodiments mitigate the need for optical alignment techniques through the use of a fiber laser and fiber optics.

Figure 3:
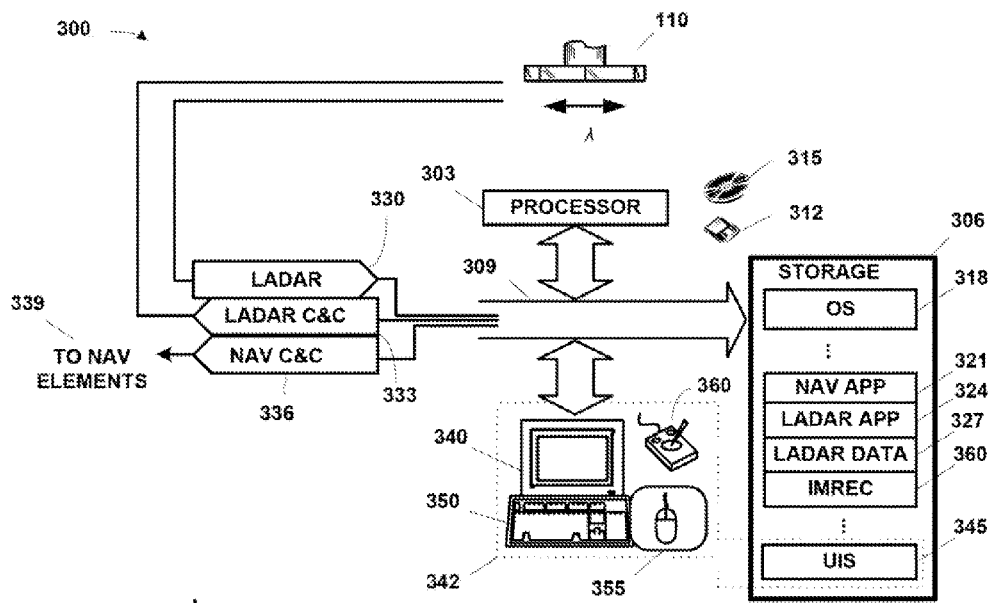
FIG. 3 shows selected portions of the hardware and software architecture of a computing apparatus such as may be employed in some aspects of the present invention.

Some aspects of the imaging system 100's operation are under computational control. FIG. 3 shows selected portions of the hardware and software architecture of a computing apparatus 300 such as may be employed in some aspects of the present invention. The computing apparatus 300 includes a processor 303 communicating with storage 306 over a bus system 309.

The processor 303 may be any suitable processor known to the art. Those in the art will appreciate that some types of processors will be preferred in various embodiments depending on familiar implementation specific details. For example, some processors are more powerful and process faster so that they may be more preferred where large amounts of data are to be processed in a short period of time. On the other hand, some processors consume more power and available power may be severely limited in some embodiments. Low power consumption processors may therefore be preferred in those embodiments.

These kinds of factors are commonly encountered in the design process and will be highly implementation specific. Because of their ubiquity in the art, such factors will be easily reconciled by those skilled in the art having the benefit of this disclosure. Those in the art having the benefit of this disclosure will therefore appreciate that the processor 303 may be a micro-controller, a controller, a microprocessor, a processor set, or an appropriately programmed application specific integrated circuit ("ASIC") or field programmable gate array ("FPGA"). Some embodiments may even use some combination of these processor types.

The storage 306 may include a hard disk and/or random access memory ("RAM") and/or removable storage such as a floppy magnetic disk 312 and an optical disk 315. The storage 306 is encoded with a number of software components. These components include an operating system ("OS") 318, a navigation application 321, and a LADAR application 324. The storage also includes a data structure 327 including LADAR data 330 acquired via the imaging system 110. As is apparent from the description herein, the imaging system 110 in this embodiment is a LADAR system and so the 3D imaging data is LADAR data.

Note that, in this context, an "image" is a collection of ordered data representative of a tangible, real world environment. This includes tangible, real world objects that comprise that environment. The LADAR data 330 acquired as described herein is ordered by the angle in azimuth, the angle in elevation, and the range associated with its acquisition. The image may, or may not be, rendered for human perception either by electronic display or by hard copy reduction. However, the disclosed technique is indifferent as to whether such a rendering occurs. The image in the illustrated embodiments is not rendered but is instead analyzed without rendering.

As with the processor 303, implementation specific design constraints may influence the design of the storage 306 in any particular embodiment. For example, it is well known that certain types of types of memory (e.g., cache) have much faster access times than other types (e.g., disk memory). Some types of memory will also consume more power than others. Some embodiments may wish to only temporarily buffer acquired data whereas others may wish to store it for a more prolonged period. As with the processor 303, these kinds of factors are commonplace in the design process and those skilled in the art having the benefit of this disclosure will be able to readily balance them in light of their implementation specific design constraints.

The processor 303 operates under the control of the OS 318 and executes the navigation application 321 and LADAR application 324 over the bus system 309. This process may be initiated automatically, for example upon startup, or upon user command. User command may be directly through a use interface which may be as simple as a button on the vehicle 100 or remotely over some kind of wireless communication.

The LADAR application 324 in this particular embodiment both processes the LADAR data 330 and issues LADAR control and command ("C&C") signals 333 to the imaging system 110. LADAR C&C signals 330 may include, for example, control and timing signals for the fiber laser 220, first shown in FIG. 2B, and control signals to the motor rotating the polygonal mirror 200. The processed LADAR data is forwarded to the navigation application 321.

The navigation application 321 analyses the processed LADAR data 330 and issues navigation C&C signals 336 to the navigation elements 339 of the vehicle 100. These signals may include, for example, commands controlling propulsion to accelerate or decelerate, or instructions to brake, or engine idle, or any number of similar functions involved in the navigation of the vehicle 100. Some embodiments may also employ positioning systems that might comprise a part of the navigation elements 339 and controlled by the navigation application 321.

The computing system 300 of the illustrated embodiment also employs a user interface 342. The user interface 342 includes user interface software 335 and a display 340. It may also include peripheral I/O devices such as a keypad or keyboard 350, a mouse 355, or a joystick 360. The user interface 342 may be embedded in the vehicle 100 or may be external thereto and interfacing therewith over a wired or wireless connection. These will be implementation specific details that are not germane to the presently disclosed technique. Accordingly, the technique admits wide variation in this aspect of the computing system 300 and any conventional implementation known to the art may be used.

Furthermore, there is no requirement that the functionality of the computing system 300 described above be implemented as disclosed. For example, the navigation application 321 and LADAR application 324 may be implemented in some other kind of software component, such as a daemon or utility. The functionality of the navigation application 321 and LADAR application 324 need not be separated into two components. The functionality may be aggregated into a single component or distributed across more than two components. Similarly, the data structure 327 may be implemented using any suitable data structure known to the art.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 4A:
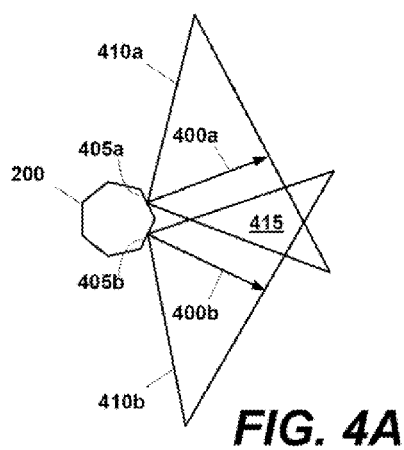
FIG. 4A-FIG. 4C illustrate the FOV of the imaging system in azimuth and the scanning in elevation.
Figure 4B:
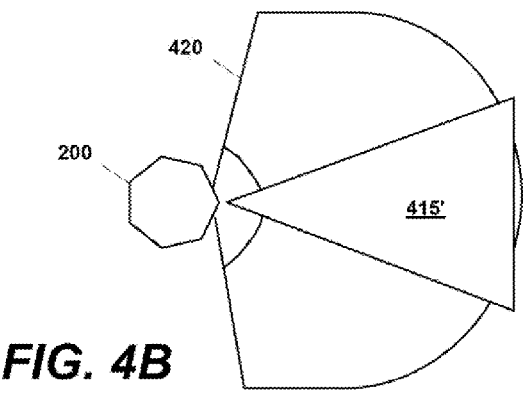

Turning now to operation, FIG. 4A-FIG. 4B illustrate the FOV for the imaging system in azimuth. Referring first to FIG. 4A, two signals 400a-b are transmitted from the polygon mirror 200 by reflection from two different facets 405a-b. Those in the art having the benefit of this disclosure will appreciate that the signals 400a-b shown in FIG. 4A comprise a plurality of beamlets generated by segmenting the split signal as described above. Note, again, that the switched beam signals 400a-b are transmitted at different times in seriatim. The propagation of the signals 400a-b define the two FOVs 410a-b. The "fan" shape of the FOVs 410a-b results from the beam divergence of the beamlets over distance. This is a common phenomenon in the art. Of particular interest in FIG. 4A, note the overlap 415 between the FOVs 410a-b.

The combined FOV 420 for the imaging system 110 is shown in FIG. 4B. The combined FOV 420 is the union of the FOVs 410a-b shown in FIG. 4. The overlap 415 in FIG. 4 creates an area 415' in the combined FOV 420 that is sensed twice. This results in twice the resolution in this area relative to the rest of the FOV 420. In the illustrated embodiment, the FOV 420 is directly forward of the vehicle 100 and centered thereon. Accordingly, the area 415' is directly centered on the project path of travel for the vehicle 100. Thus, the disclosed technique provides the most resolution where needed most while maintaining observation of more peripheral areas of the FOV 420.

The extent of the FOV 420 as well as the amount of overlap 415 and the ratio of the overlap 415' to the total FOV 420 are defined by a number of traditional factors known to the art. These factors may include, for example, the beam divergence and the range from the vehicle 100. However, other factors are at play also. For example, the illustrated embodiment combines the FOV from two facets of a heptagonal mirror. Each facet of a heptagonal mirror will yield a FOV of ~98°, and the union will be ~150°. Since the FOV 420 is centered forward of the vehicle 100, the FOV 420 may be described as ~±75° "off boresight".

However, this may be varied by altering selected parameters of the illustrated embodiments. For example, some embodiments may use signals emanating from three facets 405 of the mirror. Note that this will require three transmission paths 215, thereby increasing weight, space, and cost requirements. It will also reduce range since the signals 400 are all split out from the same original laser signal. The reduced range may be overcome by adding additional lasers, but this will further increase weight, space, and cost requirements. Alternative embodiments may therefore achieve FOVs of varying magnitude but at the cost of engineering design choices. The resolution of these choices in any given context will become apparent to those skilled in the art having the benefit of this disclosure.

Those in the art having the benefit of this disclosure will also appreciate that the signals 400a-b are not transmitted simultaneously. As described above, they generate from a single laser signal that is switched between two transmission paths. While this synchronizes the signals 400a-b, it also means that they are not transmitted at the same time. However, they are transmitted sufficiently contemporaneously both temporally and spatially that their resultant returns can be used to generate a single image.

Figure 4C:
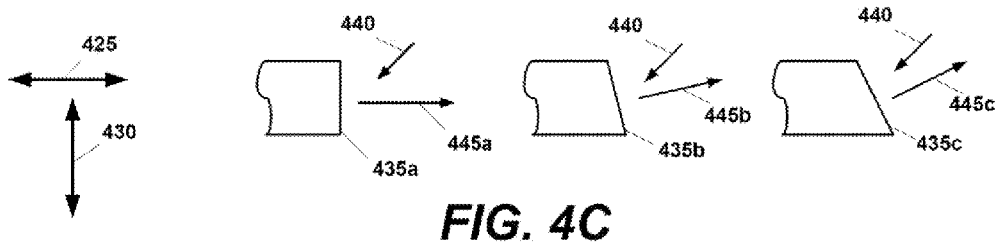

Scanning in elevation is handled differently and is illustrated in FIG. 4C. The rotation of the polygonal mirror 200 is planar as described above and indicated by the graphic 425, and so elevational scanning is not performed mechanically. Instead, the face of each facet is angled relative to the normal of the rotational plane, indicated by the graphic 430. Three successive facets 435a-c of the polygonal mirror 200 in one particular embodiment are shown in profile. Each successive facet 435a-c is successively more angled relative to the normal 430. The facet 435a is angled coincidentally with the normal 430 and the segmented beam 440 is reflected directly out into the FOV coincidentally with the plane of rotation 425. As successive facets are presented, the reflections 445a-c gradually progress in elevation. Thus, as the polygonal mirror 200 rotates, the beam is scanned in elevation.

Thus, in the illustrated embodiments, the beamlets of the switched beam laser signals are reflected off the facets of the polygonal mirror as it rotates. The beam separation of the beamlets provides the coverage in elevation while beam separation created by the mirror motion provides coverage azimuth. Scanning in elevation occurs as the vertically segmented beamlets are reflected off facets whose faces vary relative to the normal of the plane of rotation. Accordingly, the imaging system 110 of the illustrated embodiments scans in both elevation and azimuth with only a single moving part, that being the polygonal mirror. Note, however, that this is only an exemplary means by which such scanning can be performed. Alternative embodiments may use other means, including means of equivalent structure that perform he disclosed functions.

The illustrated embodiments may run in at least two different modes defined by timing of the switching on the transmit side 209, shown in FIG. 2B. In a first mode, called "continuous scan mode", the fiber optic switch 224 switches between the first and second paths 215a-b whenever an output signal traverses the boundary, like the boundary 500 in FIG. 5A, between two facets, e.g., the facets 505a-505b. A second mode, referred to as "dual framing mode", switches between the first and second paths 215a-b whenever the fiber optic laser 221 pulses. This can also be determined from the trigger.

In the illustrated embodiments, both modes yield ~150° FOV in azimuth, at ~±75° "off boresight" with ~32.7° FOV in elevation with a 40° sector of overlap in which the imaging system 110 realizes twice the sample rate (i.e., resolution) of that in the areas without overlap. However, the continuous scan mode will acquire an image at 10 Hz upon two rotations of the polygonal mirror 200. (Note that this mode of operation needs a polygonal shape for the mirror 200 having an odd number of sides.) The dual framing mode, on the other hand, will yield left/right images at 10 Hz, although this can vary depending upon operational parameters such as the pulse repetition frequency of the fiber laser 221 or the rotational speed of the polygonal mirror 200.

Figures 5A, 5B, 5C:
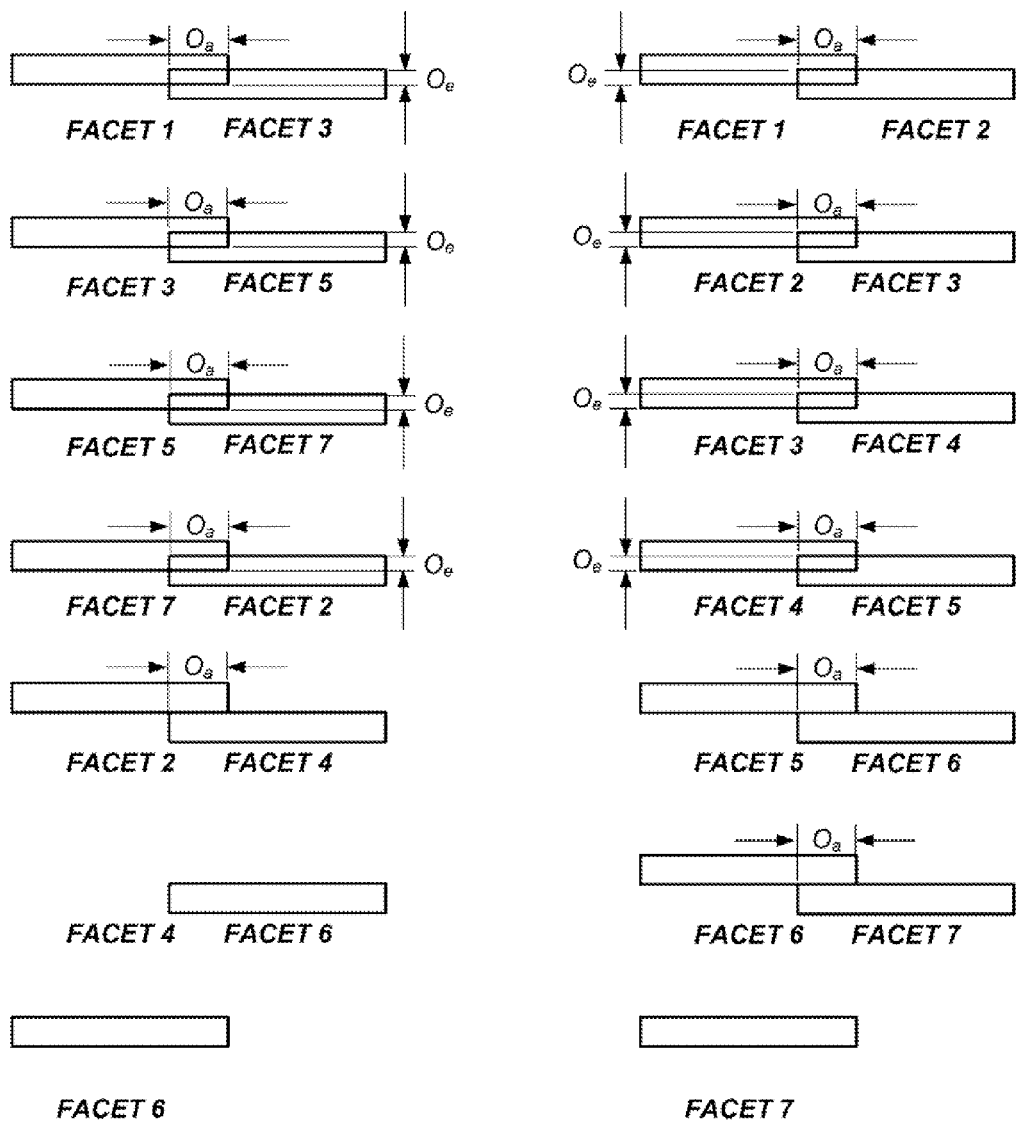
FIG. 5A-FIG. 5C depict imaging in two modes of operation, including overlap in FOV.

These differences are graphically illustrated in FIG. 5B-FIG. 5C. Both drawings use the integers 1-7 shown in FIG. 5A to identify the facets. FIG. 5B depicts a two facet, continuous scan acquisition through a single revolution—i.e., half of an image acquisition in continuous scan. FIG. 5C depicts a two facet dual framing scan acquisition through a single revolution—i.e., a full image acquisition in dual frame scanning. Overlap in the scans in azimuth is represented by the overlap $O_a$ and overlap in elevation is represented by the overlap $O_e$ where present.

Figure 6:
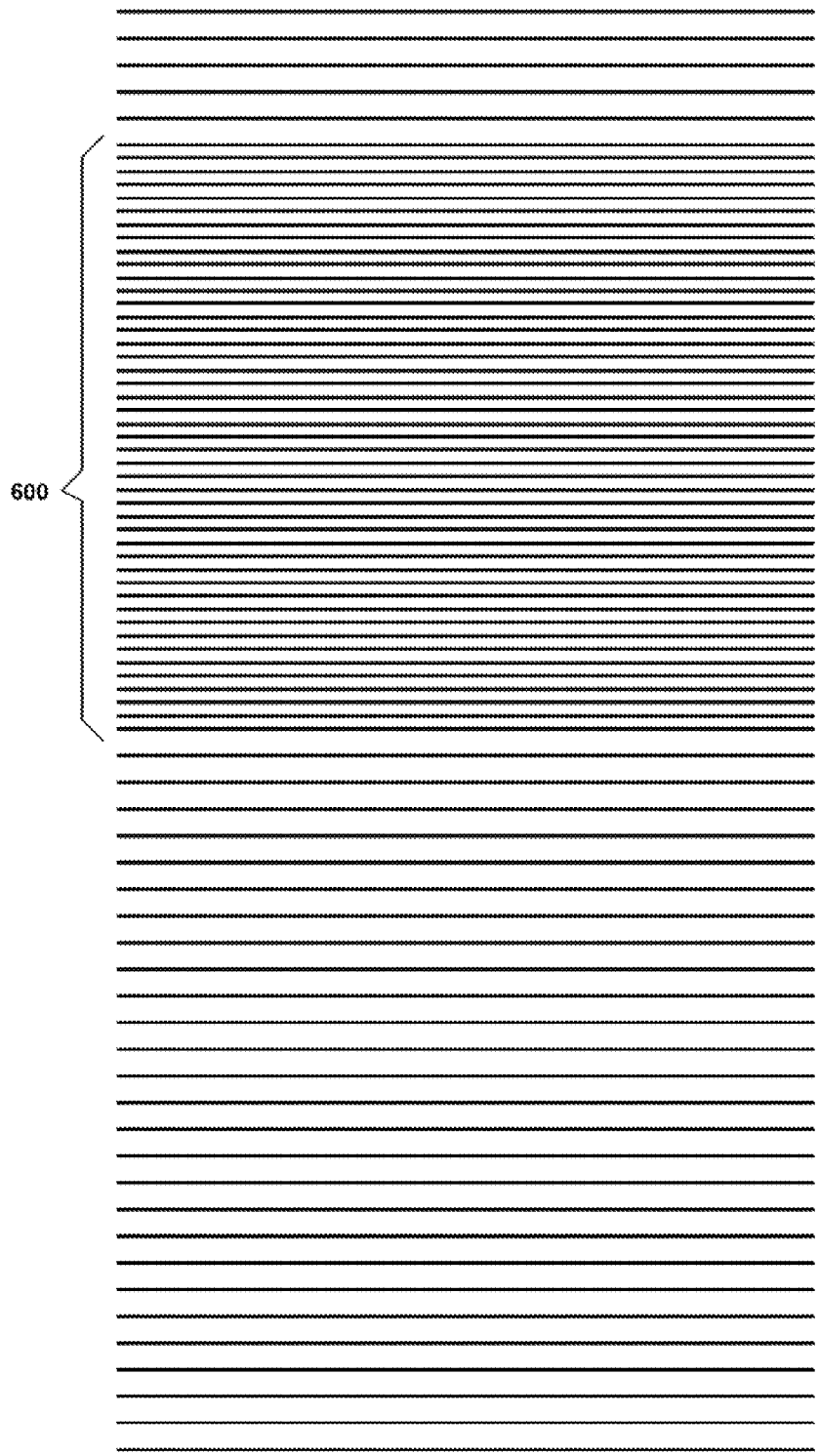
FIG. 6 depicts a portion of an image showing the manifestation of the overlap in the FOV in the increased resolution in a portion of the image.

FIG. 6 depicts a portion of an exemplary image and illustrates how the overlap in the FOV increases resolution in the image. In FIG. 6, the scan in azimuth is in the horizontal direction. Each scan comprises 11 channels of data, each represented by a line in FIG. 6. Each of the channels reflects the nominal beam separation of the beamlets into which the switched laser signals are segmented. In the illustrated embodiment, this is approximately 0.6°. However, in the section 600 of the image, the overlap in the FOV in azimuth appears as twice the number of lines representing a beam separation of approximately 0.3°.

The embodiments illustrated above contemplate use only with positive obstacles. Those in the art having the benefit of this disclosure will appreciate that the ability to detect and recognize negative obstacles such as ditches, ravines, gullies, etc. will also frequently be useful if not desirable. This can be accomplished by controlling the scan in elevation. As indicated above, the elevation of the scan is controlled by angling the face of the facet relative to the normal of the polygonal mirror as shown in FIG. 4C and discussed in the associated text.

Once the LADAR data 327, shown in FIG. 3, is acquired as discussed above, it can be analyzed to determine how to navigate the vehicle 100, shown in FIG. 1. There are a variety of approaches known to the art in which LADAR data is analyzed for this purpose. Any suitable approach known to the art may be used. In the illustrated embodiment, this functionality may be a part of the navigation application 321, or a part of the LADAR application 324, or performed in an entirely separate software component. In some embodiments, this functionality will be performed by a separate application such as the image recognition ("IMREC") application 360 dedicated for this purpose. The results of the image recognition can then be used to generation the navigation command and control signals 336 to pilot the vehicle 100.

The phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electromechanical parts that, to operate, require electrical power. Even when provided with power, some functions described herein only occur when in operation or at particular points in their operation. Thus, at times, some embodiments of the apparatus of the invention are "capable of" performing the recited functions even when they are not actually performing them—i.e., when there is no power, or when they are powered but not in operation, or during certain aspects of their operation.

The following patents and applications are hereby incorporated for the purposes described as if set forth verbatim herein:

U.S. Pat. No. 7,261,176, entitled, "Articulated Vehicle Suspension System Shoulder Joint", issued Aug. 28, 2007, to Lockheed Martin Corporation as assignee of the inventors Wendel H. Chun, et al.

U.S. application Ser. No. 11/609,517, entitled, "Vehicle Having An Articulated Suspension And Method Of Using Same", filed Dec. 12, 2006, in the name of the inventors Michael S. Beck, et al., published Apr. 12, 2007, as Patent Publication No. 2007/0080001, assigned to Lockheed Martin Corporation, and currently co-pending.

U.S. Pat. No. 7,464,775, entitled, "Payload Module for Mobility Assist", issued Dec. 16, 2008, to Lockheed Martin Corporation as assignee of the inventors David A. Clemens, et al.

U.S. application Ser. No. 12/623,739, entitled, "Compact Collimator Lens Form for Large Mode Area and Low Numerical Aperture Fiber Laser Applications", filed Nov. 23, 2009, in the name of the inventors Lionel D. Liebman and Ronald E. Janka, published May 27, 2010, as Patent Publication 2010/0128243, assigned to Lockheed Martin Corporation, and now abandoned.

U.S. Pat. No. 7,649,616, entitled, "Fiber Laser LADAR", issued Jan. 19, 2010, to Lockheed Martin Corporation as assignee of the inventors Michael E. Christopher et al.

In the event of any conflict between any incorporated reference and the present disclosure within the four corners of this document, the present disclosure controls.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An imaging system, comprising:
    a polygonal mirror comprising a plurality of reflective polygon facets including a first polygon facet and an adjacent second polygon facet;
    a transmit side that generates a plurality of switched beam laser signals and scans the plurality of switched beam laser signals into a first field of view by the first polygon facet and into a second field of view by the second polygon facet, the first field of view and the second field of view forming an overlapping field of view portion that expands in a direction of laser signal propagation, the first field of view further comprising a first non-overlapping field of view portion and the second field of view further comprising a second non-overlapping field of view portion; and
    a receive side that receives a plurality of reflections of the plurality of switched beam laser signals, the receive side configured to generate imagery data, based on the plurality of reflections, that has a first resolution of the first non-overlapping field of view portion and the second non-overlapping field of view portion, and a second resolution of the overlapping field of view portion that is a greater resolution than the first resolution.

2. The imaging system of claim 1, wherein each reflective polygon facet of the plurality of reflective polygon facets is at a different angle and, through a single rotation of the polygonal mirror, an entire image frame is captured vertically and horizontally.

3. The imaging system of claim 1, further comprising a computing apparatus including:
    a processor, configured to:
        control a motor coupled to the polygonal mirror to rotate the polygonal mirror to reflect and scan the plurality of switched beam laser signals;
        control the transmit side to generate the plurality of switched beam laser signals and scans; and
        control the receive side to generate the imagery data based on the plurality of reflections;
    a bus system, communicatively coupled to the processor; and
    a storage, communicatively coupled to the bus system, configured to communicate with the processor over the bus system, comprising:
        a first software component that, when invoked by the processor over the bus system, configures the processor to control the motor coupled to the polygonal mirror, the transmit side, and the receive side; and
        a data structure to store the imagery data.

4. The imaging system of claim 3, the storage further comprising a second software component that, when invoked by the processor over the bus system, configures the processor to:
    perform an image recognition on the stored imagery data; and
    generate image recognition information based on the imagery data.

5. The imaging system of claim 1, wherein the transmit side comprises:
    a laser configured to generate an initial laser signal;
    a plurality of transmission paths, each transmission path configured to propagate a switched beam laser signal of the plurality of switched beam laser signals; and
    a fiber optic switch configured to switch the initial laser signal to generate the plurality of switched beam laser signals and provide the plurality of switched beam laser signals to the plurality of transmission paths in seriatim;

wherein the polygonal mirror comprises a rotatable polygonal mirror that scans the plurality of switched beam laser signals into the first field of view and the second field of view.

6. The imaging system of claim 1, wherein the transmit side comprises:
a laser configured to generate an initial laser signal;
a plurality of transmission paths, each transmission path configured to propagate a switched beam laser signal of the plurality of switched beam laser signals;
means for generating the plurality of switched beam laser signals from the initial laser signal; and
means for scanning the plurality of switched beam laser signals into the first field of view and the second field of view.

7. The imaging system of claim 1, wherein the plurality of switched beam laser signals has an eye-safe frequency.

8. The imaging system of claim 1, wherein the receive side comprises:
a plurality of receive paths, each receive path comprising an optical detector configured to detect a reflection of the plurality of reflections of switched beam laser signals and to generate a corresponding signal representative thereof;
an optical coupler; and
a plurality of laser receive electronics coupled to the plurality of receive paths by the optical coupler, each laser receive electronics configured to receive a signal representative of a corresponding reflection of the plurality of reflections from a corresponding receive path and to generate a corresponding digital signal representative of the corresponding reflection of the plurality of reflections; and
a plurality of pulse capture electronics, configured to capture the plurality of digital signals as the imagery data.

9. The imaging system of claim 8, wherein the receive side further comprises means for optically aligning the optical detectors.

10. A method, comprising:
generating a plurality of switched beam laser signals from a single laser signal;
scanning each of the switched beam laser signals in seriatim into a first field of view by a first polygon facet of a plurality of polygon facets of a polygonal mirror and into a second field of view by a second polygon facet of the plurality of polygon facets of the polygonal mirror, the first field of view and the second field of view forming an overlapping field of view portion that expands in a direction of laser signal propagation, the first field of view further comprising a first non-overlapping field of view portion and the second field of view further comprising a second non-overlapping field of view portion;
receiving a plurality of reflections of the plurality of switched beam laser signals; and
generating imagery data, based on the plurality of reflections, that has a first resolution of the first non-overlapping field of view portion and the second non-overlapping field of view portion, and a second resolution of the overlapping field of view portion that is a greater resolution than the first resolution.

11. The method of claim 10, wherein the scanning further comprises rotating the polygonal mirror to capture an entire image frame vertically and horizontally, wherein each facet of the plurality of polygon facets is at a different angle.

12. The method of claim 10, further comprising performing image recognition on the imagery data.

13. The method of claim 12, further comprising navigating an unmanned vehicle based on the results of the image recognition.

14. The method of claim 12, wherein
generating the plurality of switched beam laser signals comprises segmenting the switched beam laser signals into a plurality of beamlets;
scanning each of the switched beam laser signals comprises scanning the plurality of beamlets into the first field of view and the second field of view;
receiving the plurality of reflections comprises receiving reflections of the plurality of beamlets; and
generating imagery data comprises generating the imagery data from the reflections of the plurality of beamlets.

15. The method of claim 12, further comprising generating the plurality of switched beam laser signals at an eye-safe frequency.

16. An imaging system, comprising:
a transmit side that generates a plurality of switched beam laser signals and scans the plurality of switched beam laser signals into a first field of view by a first polygon facet of a polygonal mirror and into a second field of view by a second polygon facet of the polygonal mirror, the first field of view and the second field of view forming an overlapping field of view portion that expands in a direction of laser signal propagation, the first field of view further comprising a first non-overlapping field of view portion and the second field of view further comprising a second non-overlapping field of view portion, the transmit side including:
a laser configured to generate an initial laser signal;
a plurality of transmission paths, each transmission path configured to propagate a switched beam laser signal of the plurality of switched beam laser signals;
means for generating the plurality of switched beam laser signals from the initial laser signal; and
the polygonal mirror;
a receive side that receives a plurality of reflections of the plurality of switched beam laser signals, the receive side configured to generate imagery data, based on the plurality of reflections, that has a first resolution of the first non-overlapping field of view portion and the second non-overlapping field of view portion, and a second resolution of the overlapping field of view portion that is a greater resolution than the first resolution;
a processor, configured to:
control a motor coupled to the polygonal mirror to rotate the polygonal mirror to reflect and scan the plurality of switched beam laser signals;
control the transmit side to generate the plurality of switched beam laser signals and scans; and
control the receive side to generate the imagery data based on the plurality of reflections;
a bus system, communicatively coupled to the processor; and
a storage, communicatively coupled to the bus system, configured to communicate with the processor over the bus system, comprising:
a first software component that, when invoked by the processor over the bus system, configures the processor to control the motor coupled to the polygonal mirror, the transmit side, and the receive side; and
a data structure to store the imagery data.

17. The imaging system of claim 16, wherein each reflective polygon facet of a plurality of reflective polygon facets of the polygonal mirror is at a different angle and, through a single rotation of the polygonal mirror, an entire image frame is captured vertically and horizontally.

* * * * *